United States Patent Office.

JOTHAM NEWTON, OF PROVIDENCE, RHODE ISLAND.

Letters Patent No. 113,083, dated March 28, 1871.

IMPROVEMENT IN COMPOSITION-FUELS.

The Schedule referred to in these Letters Patent and making part of the same.

*To all whom it may concern:*

Be it known that I, JOTHAM NEWTON, of the city and county of Providence and State of Rhode Island, have invented a new and useful Improvement in the Manufacture of Composition-Fuel; and I do hereby declare that the following specification is a full, clear, and exact description thereof.

The invention hereinafter described does not consist, broadly, in making a composition-fuel from fine coal-dust made coherent by mixing with coal-tar, but in the process employed in the manufacture of such fuels in which coal-tar is a constituent.

The process which constitutes the improvement is as follows:

First, I take a convenient quantity of refuse coal-dust and roast it in any suitable vessel or chamber to which heat can be applied. My purpose in so doing is to expel from the coal-dust the water and the sulphur which is combined therewith. This operation tends to purify the coal and prevent the formation of sulphides and clinker, when such coal, after made into a composition-fuel, is used under steam-boilers. It also drives off the sulphurous acid and sulphureted hydrogen, which are disagreeable when such fuels are used in open grates or for household purposes.

Second, I take the coal-dust so roasted and intimately mix it with a sufficient quantity of coal-tar to make the mass plastic and capable of being molded easily into blocks, if desired. The common product of gas-works furnishes a proper material for this purpose. I also add about two per cent. of alumina and one per cent. of carbonate of potassa. The object in adding these materials is to form a strong cement to hold the minute particles of the coal together while the composition-fuel is undergoing combustion.

Third, I next divide the mass into small masses or lumps, or mold it into the form of bricks.

Fourth, I next subject the composition to the action of heat, while in a retort, for the purpose of expelling the more volatile matters contained in the mass, which can be collected and condensed and form a purified coal-tar; the heavier constituents of the coal-tar remaining in the mass and forming, with the alumina and potassa above mentioned, a cohesive cement.

A composition-fuel thus prepared is a much purer material than the native coal, from which the dust is obtained, and is valuable for all the purposes for which a fuel can be used.

I am aware that coal-dust and coal-tar have, before my invention, been mixed together, and the mass subjected to the action of heat while in a retort-chamber and the lighter constituents of the coal-tar collected and condensed.

I do not claim, therefore, this part of the process described as of my invention.

I am not aware, however, that coal-dust before being mixed with coal-tar has been roasted for the purpose of purifying the coal itself.

I claim, therefore, as of my invention—

The improvement in the manufacture of composition-fuel, substantially as described, which consists in first roasting the coal-dust; secondly, mixing such dust so prepared with coal-tar and the proportions of alumina and potassa, substantially as given, or with the equivalents of the two latter; and, thirdly, in subjecting the mass to the action of heat while in a retort sufficient to drive off the more volatile constituents of the coal-tar and bake the composition, as herein set forth.

JOTHAM NEWTON.

Witnesses:
MARY K. FULLER,
S. FULLER.